No. 806,590. PATENTED DEC. 5, 1905.
J. T. SMITH.
AUTOMATIC FEEDING DEVICE FOR BALING PRESSES.
APPLICATION FILED APR. 18, 1904.

4 SHEETS—SHEET 1.

WITNESSES
M. M. Jarvis
M. Hagerty

INVENTOR
JOHN T. SMITH
BY
Paul & Paul
HIS ATTORNEYS

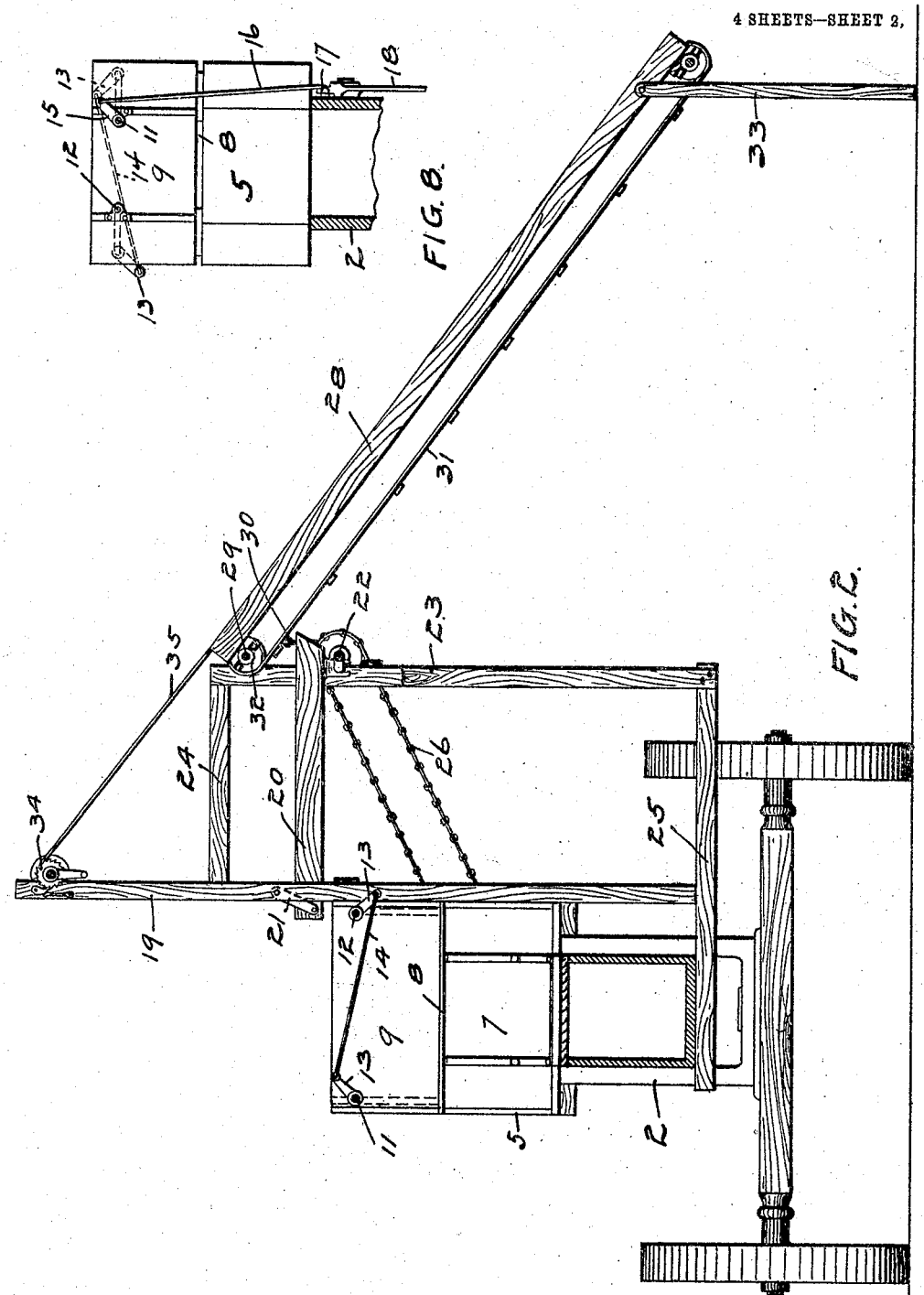

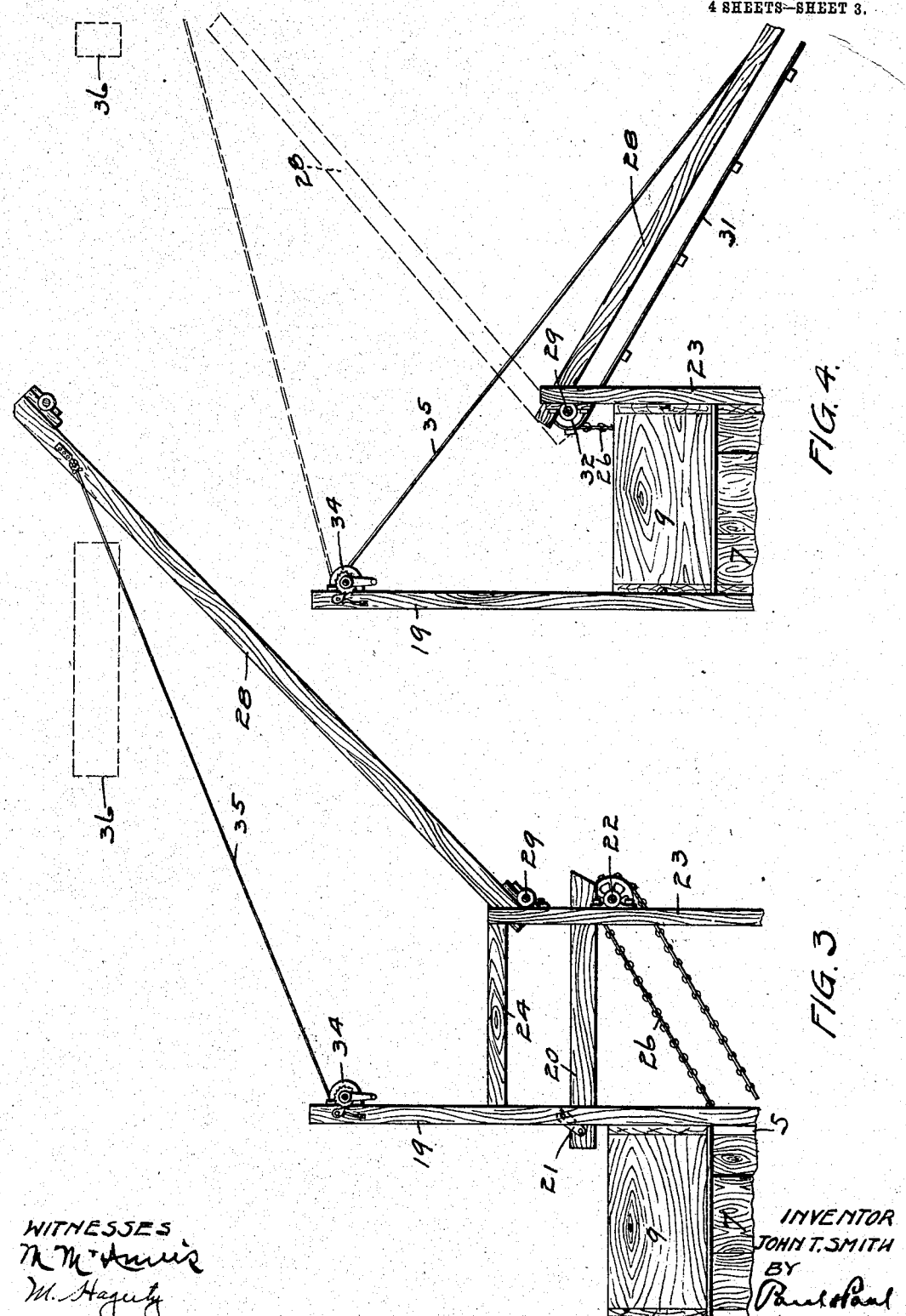

No. 806,590. PATENTED DEC. 5, 1905.
J. T. SMITH.
AUTOMATIC FEEDING DEVICE FOR BALING PRESSES.
APPLICATION FILED APR. 18, 1904.

4 SHEETS—SHEET 4.

WITNESSES
M. M. Annis
M. Hagerty

INVENTOR
JOHN T. SMITH
BY Paul & Paul
HIS ATTORNEYS

UNITED STATES PATENT OFFICE.

JOHN T. SMITH, OF HERON LAKE, MINNESOTA.

AUTOMATIC FEEDING DEVICE FOR BALING-PRESSES.

No. 806,590.           Specification of Letters Patent.           Patented Dec. 5, 1905.

Application filed April 18, 1904. Serial No. 203,562.

*To all whom it may concern:*

Be it known that I, JOHN T. SMITH, of Heron Lake, Jackson county, Minnesota, have invented certain new and useful Improvements in Automatic Feeding Devices for Baling-Presses, of which the following is a specification.

In the operation of a baling-press it is customary for an attendant to be stationed on a platform near the hopper to pitch the hay or straw therein. This method has been found objectionable, as the feed is necessarily slow and irregular, and frequently the press-plunger makes several strokes when there is no material in the compression-chamber, resulting of course in waste of time and power in the operation of the machine. Furthermore, in feeding by hand there is more or less variation in the quantity of hay or straw delivered at a time, and consequently the bales will not be of the same density throughout.

The object therefore of my invention is to provide an automatic feed which will be regular and continuous, insuring more rapid formation and uniform compression of the bales.

A further object is to provide an automatic feeding device that is adapted for use in connection with a threshing-machine, as well as taking the material from the ground.

The invention consists generally in various constructions and combinations, all as hereinafter described, and particularly pointed out in the claims.

Figure 1:
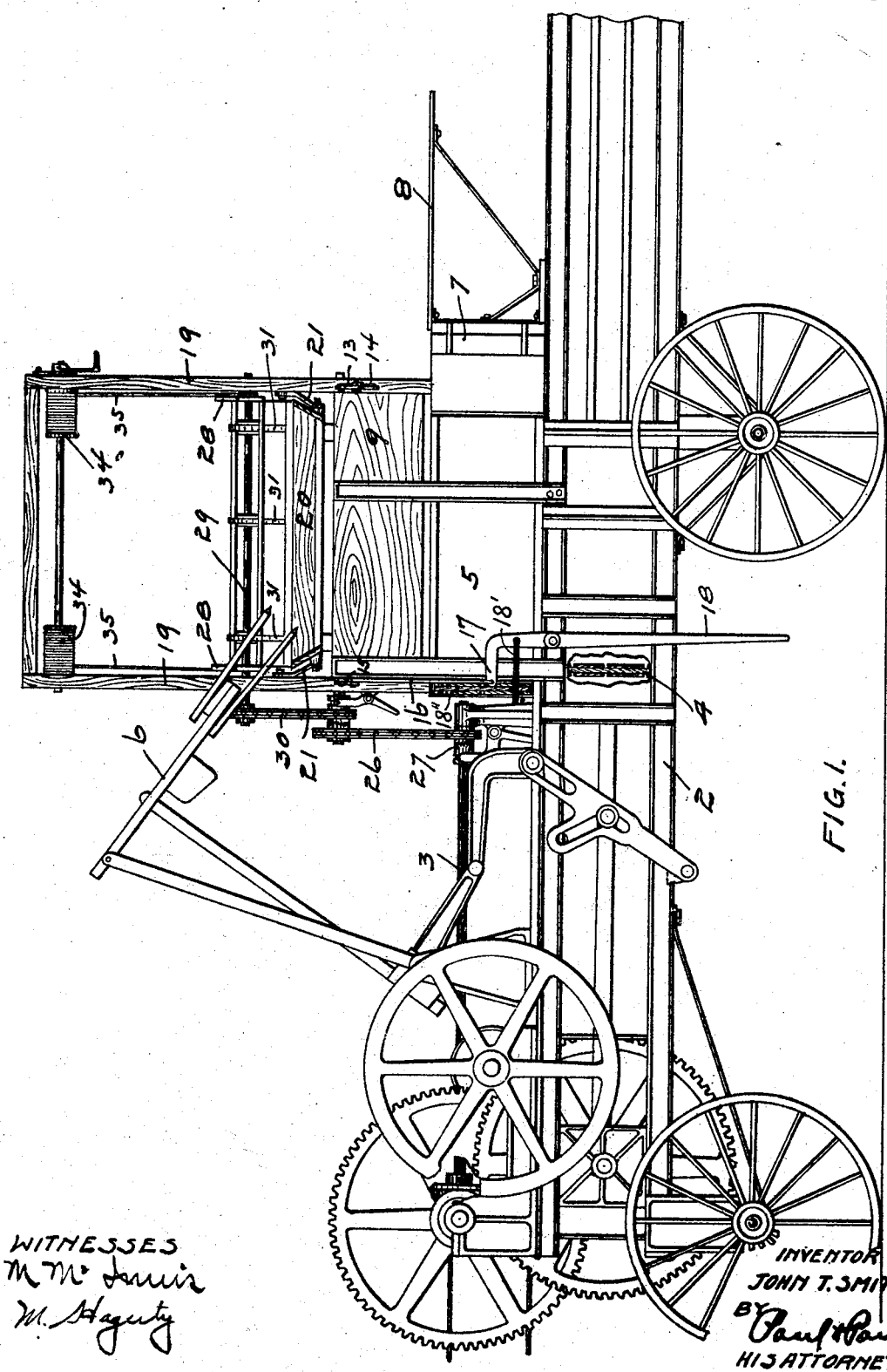
Figure 5:
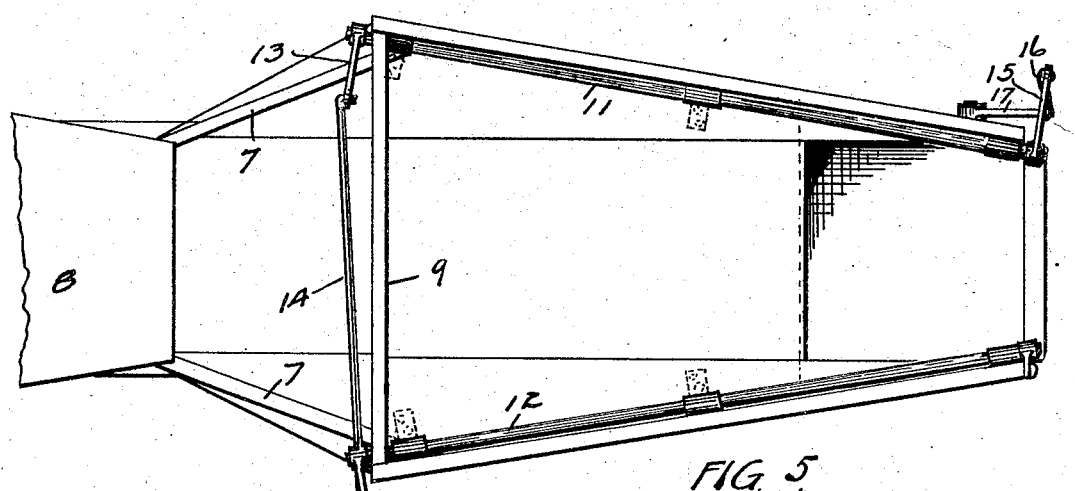
Figure 6:
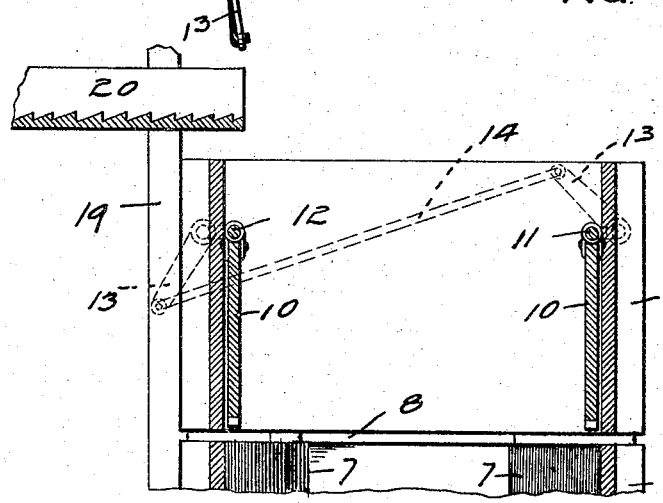
Figure 7:
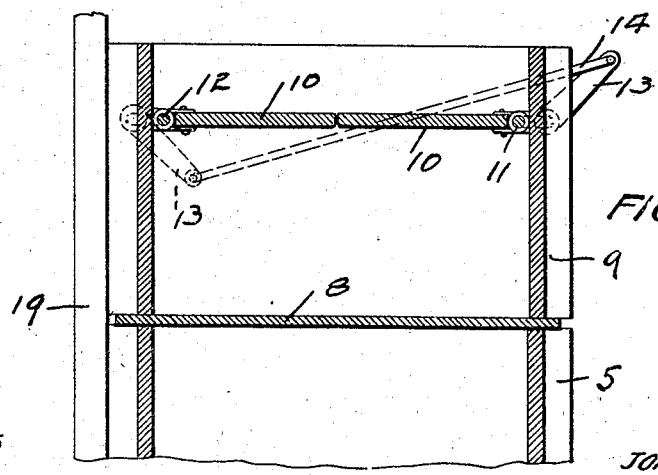

In the accompanying drawings, forming part of this specification, Figure 1 is a side elevation of a baling-press with my invention applied thereto. Fig. 2 is a vertical section showing the mechanism for delivering hay or straw to the press-hopper. Fig. 3 is a view showing the feed mechanism adapted for use with a threshing-machine. Fig. 4 shows a slightly-modified construction. Fig. 5 is a plan view of the hopper. Figs. 6 and 7 are sectional views of Fig. 5, showing, respectively, the open and closed positions of the gates which arrest feed of material to the hopper during the insertion of the follower-board, the closed position of the gates being indicated by dotted lines. Fig. 8 is a detail of the lever mechanism for operating these gates.

In the drawings, 2 represents a hay-press of the ordinary type having a driven shaft 3, a compression-chamber 4, a condenser 5, and a fork 6, all of ordinary construction and arranged in the usual way. The condenser has an end wall 7 arranged to be periodically moved toward the opposite end for the purpose of compressing the hay or straw therein, and a sliding plate 8 is also arranged to move horizontally within said condenser and partially close the top thereof. The movement of this plate and the end wall of the condenser gathers the hay and presses it toward the opposite end of the hopper into the path of the fork 6, by which the material is forced down into the compression-chamber beneath.

It has been customary heretofore for an attendant standing near the condenser to pitch the hay or straw therein; but the forkfuls have been found to vary so much in size that the bales were not uniform in density, and frequently, owing to the attendant being occupied with the manipulation of some part of the mechanism, the press-plunger will make several strokes with no material in the chamber. This results in a waste of power and requires a longer time to form a bale. To obviate this difficulty and objection to the ordinary way of feeding hay or straw to the baling-press, I provide a hopper 9 above the condenser and corresponding substantially in shape thereto, but having non-collapsible walls. Within this hopper I provide gates 10, mounted on shafts 11 and 12, supported in suitable bearings in the walls of the hopper and each provided at one end with cranks 13, connected by rods 14. The shaft 11 at its opposite end is provided with a crank 15, connected by a link 16 with the short arm 17 of an operating-lever 18, pivoted on the side of the press. A link 18' is connected to the lever 18 and arranged to engage a follower-board 18'' and actuate the same when the lever is moved. The follower-board, as shown in Fig. 1, is placed in an upright position on the baling-press box near the opening into the compression-chamber, and when the lever 18 is operated this board will be moved along said top until it falls by gravity into the compression-chamber and assumes the position indicated therein in said Fig. 1. The follower-board is not secured in any way, but merely stands on the baling-press box and is pushed off into the compression-chamber when the lever is operated. The operation of the lever 18 will also cause the oscillation of the shafts 11 and 12 to close the gates and temporarily stop the feed through the hopper 9 or open the said gates and allow the hay or straw to drop into the condenser. The use of these gates renders it unnecessary to stop the feed of the machine during the operation of dropping the follower-board into the compression-chamber.

When the operator moves the lever to drop the board, the gates will be raised simultaneously to a horizontal position and the passage through the hopper closed. The material will accumulate thereon during the operation of inserting the follower-board, and when the lever is returned to its normal position the gates will be dropped and the hay or straw thereon allowed to fall into the condenser.

The gates 10 do not extend the full length of the hopper, but terminate a sufficient distance from one end thereof, as indicated in Fig. 5, to allow the fork to pass down through into the compression-chamber, even when the gates are in their closed position.

On one side of the hopper I provide upright standards 19, whereon the discharge end of the shaker 20 is supported by links 21. This shaker feeds the material into the press-hopper in a continuous uniform stream and insures a constant supply of hay or straw in the baling-chamber for the plunger to work upon. The continuous feed results in increasing the efficiency of the machine and operating it at its greatest capacity, and the uniform character of the feed insures bales of equal density at all points. The other end of the shaker is carried by a crank-shaft 22, mounted on standards 23, that are connected with the standards 19 and the frame of the press by suitable braces or bars 24 and 25. The crank-shaft is driven by a belt 26 from the driven shaft 3, and a clutch mechanism 27 is provided, by means of which the crank-shaft may be disconnected from the driven shaft. A carrier-frame 28 is pivoted on the standards 23 above the receiving end of the shaker, and a shaft 29 is connected by a belt 30 with the shaft 22, a clutch mechanism similar to the one described being provided between said belt and crank-shaft, whereby the attendant can render the carrier inoperative at any time.

A belt 31 passes over a roll 32, provided on the shaft 29, and over a similar roll at the opposite end of the carrier-frame. A pivoted standard 33 supports the free end of said carrier-frame. A windlass 34 is mounted on the standards 19 and connected with the carrier-frame by a rope or cable 35. With this mechanism the hay or straw will be fed into the hopper in a continuous even stream, insuring the rapid formation of the bales and their uniform density and with no labor on the part of the attendant except to shut off the feed during the insertion of the follower-board.

In the figures of the drawings heretofore described the device has been adapted for use particularly where the hay or straw is pitched off a load onto the carrier or gathered up from the ground or from a stack.

I will now proceed to describe the apparatus that adapts the automatic feed mechanism for use in connection with a threshing-machine.

In Fig. 3 reference-numeral 36 represents the discharge end of a threshing-machine straw-carrier, and the carrier-frame shown in said figure is similar to the one illustrated in Fig. 2, except that it is raised to a position beneath the straw-carrier, and the belt 31 is removed, the frame forming an ordinary slide upon which the straw is discharged and delivered to the shaker and from thence fed into the hopper and condenser.

In Fig. 4 I have shown a device wherein the shaker is omitted, the carrier being arranged to deliver the material direct to the hopper, and it may rest upon the ground and employ a carrier-belt or may be raised to a position above the hopper with the belt removed to allow the straw to slide from the straw-carrier direct into the press-hopper.

I claim as my invention—

1. In a baling-press, the combination, with a compression-chamber, of an automatic feed device therefor, and mechanism for dropping the follower-board into said chamber and arresting the delivery of material thereto without stopping said feed device.

2. In a baling-press, the combination, with a compression-chamber, of a feed device, and mechanism for dropping the follower-board into said chamber and checking the feed of material to said chamber.

3. In a baling-press, the combination, with a compression-chamber, of a feed device, and mechanism for simultaneously dropping the follower-board into said chamber and arresting the delivery of material to said chamber.

4. In a baling-press, the combination, with a compression-chamber, of a hopper, a feed mechanism therefor, and mechanism for delivering a follower-board to said chamber and arresting the passage of material from said hopper to said chamber.

5. In a baling-press, the combination, with a compression-chamber, of a condenser, mechanism for delivering the material to be compressed to said condenser, and mechanism for delivering a follower-board to said chamber and arresting the delivery of material to said condenser.

6. In a baling-press, the combination, with a compression-chamber, of a feed device arranged to deliver material to said chamber, and mechanism for temporarily arresting the passage of the material into said chamber while the follower-board is being placed therein, substantially as described.

7. In a baling-press, the combination, with a compression-chamber provided with a suitable hopper, of a feed device arranged to deliver material in a continuous stream to said hopper, and means arranged to be moved across said hopper to partially close the opening therethrough and temporarily arrest the passage of the material to said compression-chamber, substantially as described.

8. In a baling-press, the combination, with a compression-chamber provided with a suitable hopper, of a feed device and gates mounted in said hopper and arranged to arrest the delivery of material from said feed device to said chamber.

9. In a baling-press, the combination, with a compression-chamber provided with a suitable hopper, of shafts mounted in said hopper, gates carried by said shafts and arranged to swing across said hopper and partially close the passage therethrough, and a lever mechanism arranged to operate said shafts and open and close said gates.

10. In a baling-press, the combination, with a compression-chamber provided with a suitable hopper, of gates pivotally supported in said hopper and arranged to swing across and partially close the passage therethrough, a lever mechanism for operating said gates, and an automatic feed device arranged to deliver material to said hopper.

11. In a baling-press, the combination, with a compression-chamber, of a shaker arranged to deliver material in a continuous uniform stream to said chamber, substantially as described.

12. In a baling-press, the combination, with a compression-chamber, of a shaker arranged to deliver material in a continuous stream to said chamber, and a feed device provided in connection with said shaker.

13. In a baling-press, the combination, with a compression-chamber, of a shaker arranged to deliver material thereto, and a tilting feed device provided in connection with said shaker.

14. In a baling-press, the combination, with a compression-chamber, of mechanism arranged to partially close the passage to said chamber and temporarily arrest the delivery of material thereto while the follower-board is being placed in position, substantially as described.

In witness whereof I have hereunto set my hand this 9th day of April, 1904.

JOHN T. SMITH.

In presence of—
E. J. GRIMES,
W. B. DREWS.